US005749020A

United States Patent [19]

Mestha et al.

[11] Patent Number: 5,749,020

[45] Date of Patent: May 5, 1998

[54] COORDINITIZATION OF TONE REPRODUCTION CURVE IN TERMS OF BASIS FUNCTIONS

[75] Inventors: Lingappa K. Mestha, Fairport; Yao Rong Wang, Webster; Sohail A. Dianat, Pittsford, all of N.Y.; Pramod P. Khargonekar; Daniel E. Koditschek, both of Ann Arbor, Mich.; Eric Jackson, Rochester; Tracy E. Thieret, Webster, both of N.Y.

[73] Assignee: Xerox Corporation, Stamford, Conn.

[21] Appl. No.: 754,571

[22] Filed: Nov. 21, 1996

[51] Int. Cl.[6] .................................................... G02G 15/00

[52] U.S. Cl. .................................................... 399/49

[58] Field of Search .................................... 399/39, 42, 49

[56] References Cited

U.S. PATENT DOCUMENTS

| | | | |
|---|---|---|---|
| 4,780,744 | 10/1988 | Porter et al. | 399/39 |
| 4,806,980 | 2/1989 | Jamzadeh et al. | 399/39 |
| 5,450,165 | 9/1995 | Henderson | 355/208 |
| 5,543,896 | 8/1996 | Mestha | 399/49 |

*Primary Examiner*—Joan H. Pendegrass

*Attorney, Agent, or Firm*—Ronald F. Chapuran

[57] ABSTRACT

Fundamental machine functions such as the Tone Reproduction Curve need to be divided into regions of smaller units so that each unit can be interrelated to some aspects of the internal machine process. A first step toward that is by decomposing measured TRC in terms of what are known as "orthogonal basis functions". Two significant applications for orthogonal basis functions may be extensive use in color controls to maintain color consistency for every page, every time and all the time. The use of basis functions might also lead to a new soft sensor for use in certain machines.

24 Claims, 4 Drawing Sheets

COORDINITIZATION OF TONE REPRODUCTION CURVE IN TERMS OF BASIS FUNCTIONS

BACKGROUND OF THE INVENTION

The invention relates to xerographic process control, and more particularly, to the coordinitization of a tone reproduction curve in terms of basis functions for machine control.

In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a "densitometer", is disposed along the path of the photoreceptor, directly downstream of the development of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch.

Xerographic test patches are traditionally printed in the interdocument zones on the photoreceptor. They are used to measure the deposition of toner on paper to measure and control the tone reproduction curve (TRC). Generally each patch is about an inch square that is printed as a uniform solid half tone or background area. This practice enables the sensor to read one value on the tone reproduction curve for each test patch. However, that is insufficient to complete the measurement of the entire curve at reasonable intervals, especially in a multi-color print engine. To have an adequate number of points on the curve, generally multiple test patches have to be created.

Thus, the traditional method of process controls involves scheduling solid area, uniform halftones or background in a test patch. Some of the high quality printers contain many test patches. During the print run, each test patch is scheduled to have single halftone that would represent a single byte value on the tone reproduction curve. This is a complicated way to increase the data bandwidth required for the process control loops. It also consumes customer toner for printing many test patches.

To achieve a high quality image, the entire TRC of the image to be printed or copied must be maintained by the controls system of the printer/copier. The TRC of the printed/copied image is affected by several variables, including changes in the environmental conditions such as humidity, temperature, and uncontrolled changes in the xerographic elements, such as the photoreceptor, laser and developer material.

It is known in pending application Ser. No. 08,527,616, now U.S. Pat No. 5,543,896 filed Sep. 13, 1995, to provide a single test pattern, having a scale of pixel values, in the interdocument zone of the imagining surface and to be able to respond to the sensing of the test pattern and reference tone reproduction curve to adjust the machine operation for print quality. In addition, U.S. Pat. No. 5,450,165 discloses the use of incoming data or customer image data as a test patch. In particular, a incoming data is polled for preselected density conditions to be used for test patches to monitor print quality. It is also known in the prior art to use a constraint imposed cubic spline curve fitting interpolation routine to reconstruct a tone reproduction curve.

A main difficulty with the prior art is the inability to adequately determine a tone reproduction curve without an inordinate number of test patches or samples. Also, attempts to recreate a tone reproduction curve or interpolate points on a tone reproduction curve, have not provided the required accuracy. In particular, a cubic spline curve fitting routine blindly interpolates data points without knowledge of the system being controlled. Accuracy of interpolation increases with an increase in the number of data points, but this also leads to an increased number of patches. The use of multiple test patches, independent of the actual images to be printed, unnecessarily depletes the system of toner and adds to the complexity of control. Another difficulty in the prior art, such as disclosed above is the need to poll incoming data for preselected density conditions, such as various halftone conditions, to be used for test patches to monitor print quality.

It would be desirable, therefore, to be able to use an in depth knowledge of a system to be able to accurately reconstruct an entire tone reproduction curve, as well as to be able to eliminate the need for multiple test patches. It would be desirable to be able to divide a fundamental system function such as a tone reproduction curve into regions of small units in order that each unit can be interrelated to some aspect of an internal physical process.

It is an object of the present invention, therefore, to provide a new an improved technique for process control, in particular, to provide a control having a model of the imaging system with respect to actuators for producing a predicted tone reproduction curve. It is another object of the present invention to provide an imaging system model that includes small units interrelated to a machine process and derived by decomposing measured TRC in terms of orthogonal basis functions. It is still another object of the present invention to provide a predicted tone reproduction curve that is melded with a discrete number of tone reproduction samples to provide a reconstructed tone reproduction curve for machine control. Another object of the present invention is to provide a predicted tone reproduction curve and reconstructed tone reproduction curve to be compared for machine control.

SUMMARY OF THE INVENTION

The present invention is concerned with a method of machine control by a control having a model of the imaging system respect to actuators for producing a predicted tone reproduction curve. The model includes a linear combination of basis functions, derived by decomposing sample tone reproduction curves, to provide the predicted tone reproduction curve. The predicted tone reproduction curve is melded with a discrete number of tone reproduction samples to provide a reconstructed tone reproduction curve for machine control. In another application, the predicted tone reproduction curve is compared to a separate reconstructed tone reproduction curve for machine control.

DETAILED DESCRIPTION OF THE DRAWINGS

For a better understanding of the present invention, reference may be had to the accompanying drawings wherein the same reference numerals have been applied to like parts and wherein.

DETAILED DESCRIPTION OF THE PREFERRED EMBODIMENT

Figure 1:
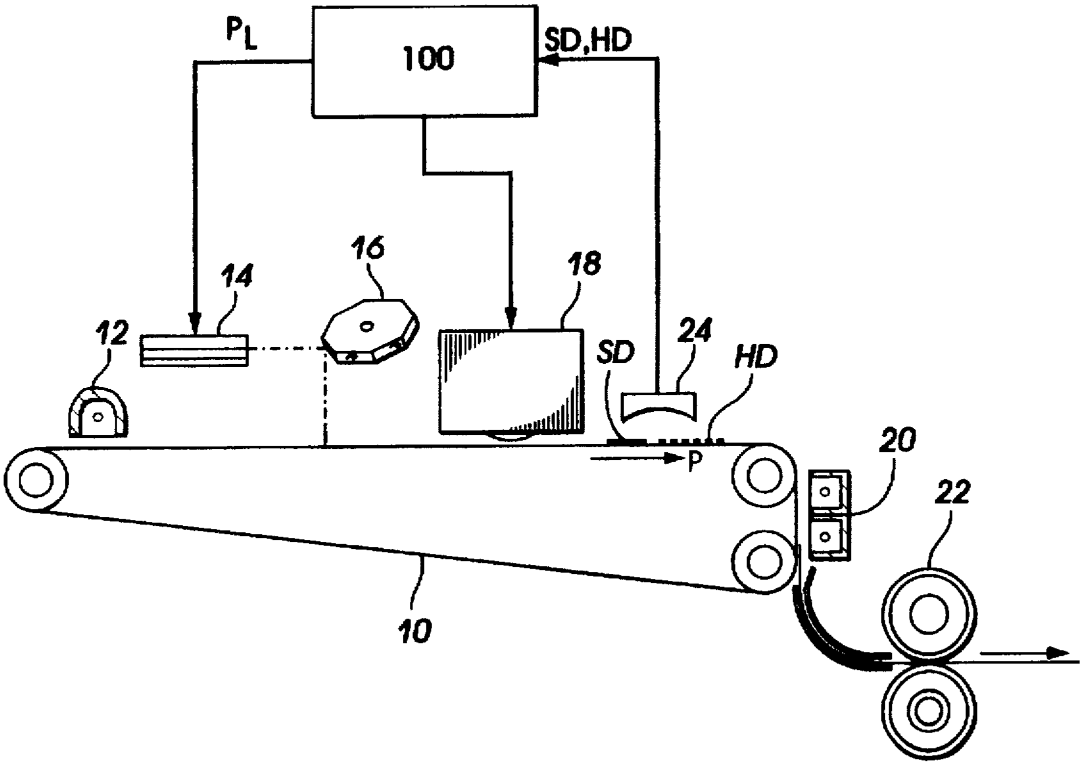
FIG. 1 is an elevational view illustrating a typical electronic imaging system incorporating tone reproduction curve control in accordance with the present invention.

FIG. 1 shows the basic elements of the well-known system by which an electrophotographic printer or laser printer uses digital image data to create a dry-toner image on plain paper. There is provided in the printer a photoreceptor 10, which may be in the form of a belt or drum, and which comprises a charge-retentive surface. The photoreceptor 10 is here entrained on a set of rollers and caused to move (by means such as a motor, not shown)through process direction P. Moving from left to right in FIG. 1, there is illustrated the basic series of steps by which an electrostatic latent image according to a desired image to be printed is created on the photoreceptor 10, subsequently developed with dry toner, and transferred to a sheet of plain paper.

The first step in the electrophotographic process is the general charging of the relevant photoreceptor surface. As seen at the far left of FIG. 1, this initial charging is performed by a charge source known as a "scorotron", indicated as 12. The scorotron 12 typically includes an ion-generating structure, such as a hot wire, to impart an electrostatic charge on the surface of the photoreceptor 10 moving past it. The charged portions of the photoreceptor 10 are then selectively discharged in a configuration corresponding to the desired image to be printed, by a raster output scanner or ROS, which generally comprises laser source 14 and a rotatable mirror 16 which act together, in a manner known in the art, to discharge certain areas of the charged photoreceptor 10. Although a laser source is shown to selectively discharge the charge-retentive surface, other apparatus that can be used for this purpose include an LED bar, or, conceivably, a light-lens system. The laser source 14 is modulated (turned on and off) in accordance with digital image data fed into it, and the rotating mirror 16 causes the modulated beam from laser source 14 to move in a fast-scan direction perpendicular to the process direction P of the photoreceptor 10. The laser source 14 outputs a laser beam of laser power PL which charges or discharges the exposed surface on photoreceptor 10, in accordance with the specific machine design.

After certain areas of the photoreceptor 10 are (in this specific instance) discharged by the laser source 14, remaining charged areas are developed by a developer unit such as 18 causing a supply of dry toner to contact the surface of photoreceptor 10. The developed image is then advanced, by the motion of photoreceptor 10, to a transfer station including a transfer scorotron such as 20, which causes the toner adhering to the photoreceptor of 10 to be electrically transferred to a print sheet, which is typically a sheet of plain paper, to form the image thereon. The sheet of plain paper, with the toner image thereon is then passed through a fuser 22, which causes the toner to melt, or fuse, into the sheet of paper to create the permanent image.

The idea of "print quality" can be quantified in a number of ways, but two key measurements of print quality are (1) the solid area density, which is the darkness of a representative developed area intended to be completely covered by toner and (2) a halftone area density, which is the copy quality of a representative area which is intended to be, for example, 50% covered with toner. The halftone is typically created by virtue of a dot-screen of a particular resolution, and although the nature of such a screen will have a great effect on the absolute appearance of the halftone, as long as the same type of halftone screen is used for each test, any common halftone screen may be used.

Both the solid area and halftone density may be readily measured by optical sensing systems which are familiar in the art. As shown, a densitometer generally indicated as 24 is here used after the developing step to measure the optical density of a solid density test patch ( marked SD) or a halftone density test patch (HD) created on the photoreceptor 10 in a manner known in the art. Systems for measuring the true optical density of a test patch are shown in, for example, U.S. Pat. No. 4,989,985 or U.S. Pat. No. 5,204,538, both assigned to the assignee hereof and incorporated by reference herein.

However, the word "densitometer" is intended to apply to any device for determining the density of print material on a surface, such as a visible-light densitometer, an infrared densitometer, an electrostatic voltmeter, or any other such device which makes a physical measurement from which the density of print material may be determined. Various sensor and switch data such as from densitometer 24 is conveyed to controller 100 which in turn responds to monitored data to control various elements of the machine being controlled.

To be able to divide a fundamental system function such as a tone reproduction curve requires a prior knowledge of the physical system or machine being controlled. In case of a TRC, it is necessary to sample all the points on the TRC for expected domain of operation in the actuator space. For example, if the concern is with the reconstruction of the TRC for the control of xerography, in which, for example, three actuators (unexposed photoreceptor charge, average beam power of the laser, and the donor roll voltage)are used as knobs for varying the system state, then the TRC curves have to be sampled for that actuator space. This can be done by conducting various input-output experiments.

In accordance with the present invention, a fundamental function such as a tone reproduction curve is divided into regions of smaller units so that each unit can be interrelated to some aspects of the internal physical process. Dividing into regions of smaller units is done by decomposing measured TRC in terms of what are known as "orthogonal basis functions". These basis functions can be used, for example, in color controls to maintain color consistency for every page, every time and all the time.

Figure 2:
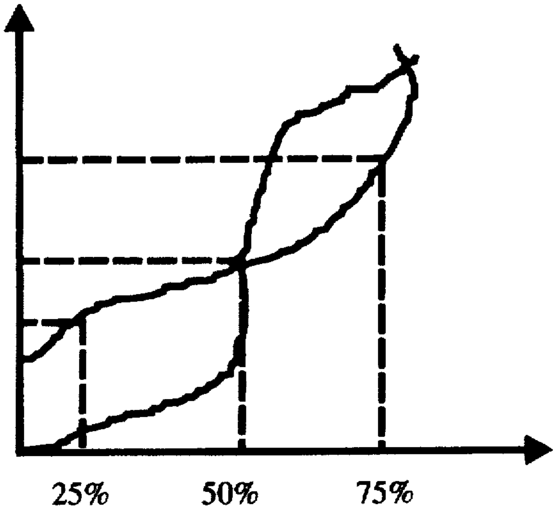
FIGS. 2 and 3 illustrate geometric interpretations of TRC samples.
Figure 3:
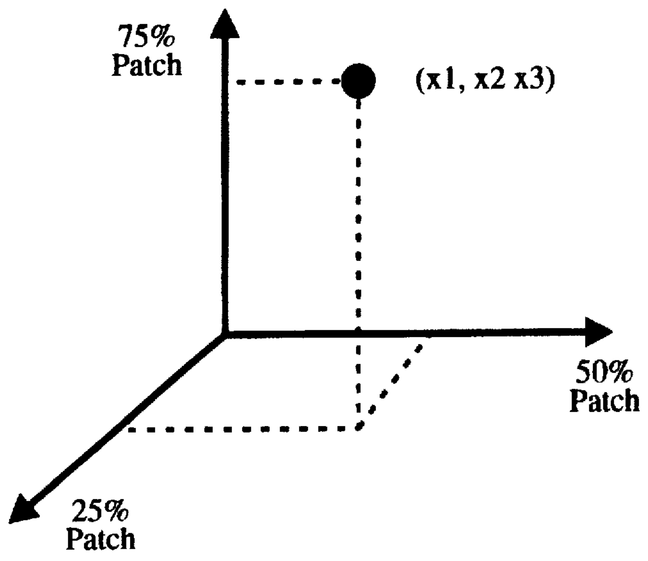

First assume a full set of input-output experiments for all possible combinations of the actuator settings (scorotron grid voltage, laser power and the donor roll bias voltage) within the operating range. For further detail, reference is made to pending application D/96502 U.S. Ser. No. 754,561 filed Nov. 21, 1996 incorporated herein. Outputs are the TRCs for each actuator setting. To decompose the TRCs into basis functions it is necessary to organize the TRC samples in a vector. In one measurement, there were 111 samples in each TRC, hence, each TRC is a vector in $\Re^{111}$. These are quantized functions. To visualize this geometrically, it is infeasible to draw pictures in greater than dimensions 3 unless the coordinate axes are stacked. In FIGS. 2 and 3, there is shown a geometric interpretation of TRC samples. At 25% in FIG. 2 there is shown one TRC sample designated by $x_1$. At 50% there is another TRC sample designated by $x_2$ and at 75% a third TRC sample designated by $x_3$. In FIG. 3 the elements $x_1$, $x_2$ and $X_3$ are mapped on 25%, 50% and 75% axes. If such elements are mapped for a second TRC, a third TRC etc., a cloud of points will emerge.

Figure 4:
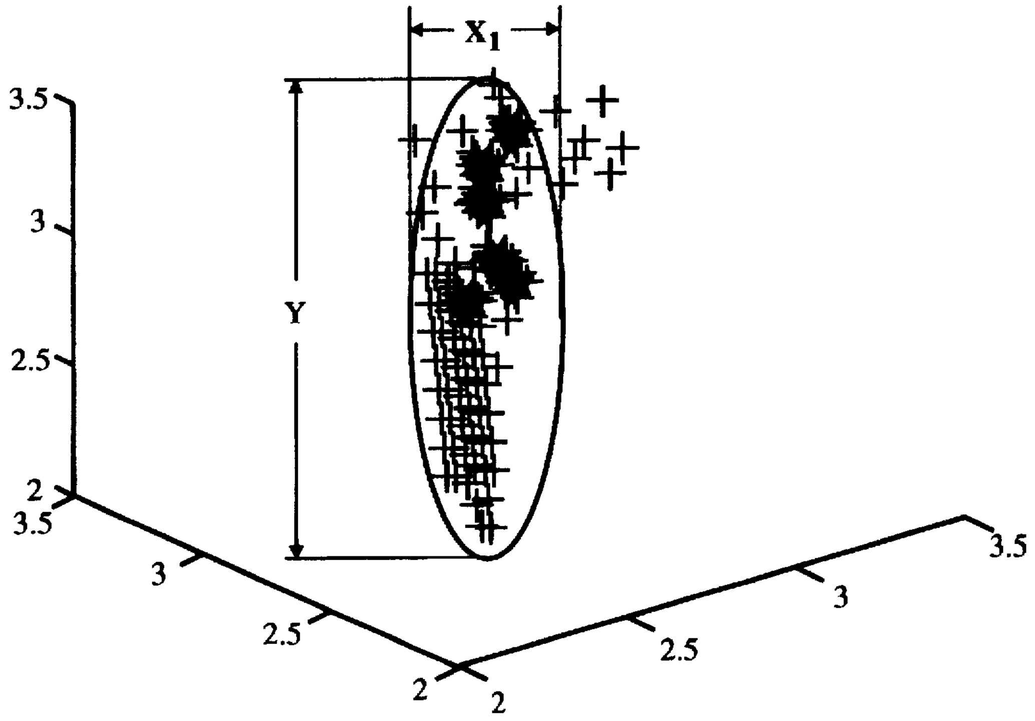
FIG. 4 illustrates a cloud diagram of TRC samples.

Shown in FIG. 4 is a cloud diagram for 121 TRCs at 40%, 50% and 60% area coverages (data is for a raw optical sensor). The vertical axis corresponds to 60% area coverage. The cloud diagram shows the complete space over which the selected three points are expected to vary when the actuators change. If the actuators are selected to cover the whole operating range of the printer, then the boundaries of the cloud diagram will show the direction in which the deviation is strong. For example, in FIG. 4, the 60% axis is showing the strongest deviation. The cloud diagram can be approximated to an ellipsoid and then decomposed into basis functions as follows.

The ellipsoid is basically the covariance matrix for a 3-dimensional space when we have three points on the TRC. On the other hand, for a higher dimensional system, i.e., when the TRC samples are greater than 3, it would be harder to visualize graphically . Hence there is shown a neat mathematical approach to understand the size of the cloud.

Let us compute the covariance matrix for all the TRC samples. It is done by the following equation. Let n be the total number of samples per TRC and there are N number of TRC sets.

$$\Sigma = \frac{1}{N} \sum_{i=1}^{N} [C_i - \overline{C}]\,[C_i - \overline{C}]^T, \text{ where } \Sigma \in \Re^{n\times n}$$

Form Singular Value Decomposition (SVD) on the covariance matrix to get basis functions.

The eigenvalues of the SVD fits the cloud. The SVD will give nonzero eigenvectors and eigenvalues. In some directions the covariance is high and in other directions it is low. It would be useful to find the strongest direction of the cloud. The first few eigenvalues (ones with largest values) turn out to be those strongest directions. Largest variation will be eliminated using the control actuation.

$$SVD(\Sigma)=\Sigma=\Psi \Pi^2 \Psi^T, \text{ when } \Psi^T\Psi=I=\text{identity matrix}$$

Also, $|\Pi_1|>|\Pi_2|> \ldots >|\Pi_n|$ are singular values, $$\text{and } \Pi = \begin{bmatrix} \Pi_1 & 0 & 0 & . & 0 \\ 0 & \Pi_2 & 0 & . & 0 \\ 0 & 0 & \Pi_3 & . & 0 \\ . & . & . & . & 0 \\ 0 & 0 & 0 & . & \Pi_n \end{bmatrix} \qquad (2)$$

or $$\Sigma = \sum_{i=1}^{n} \Pi_i^2 \Psi_i \Psi_i^T$$

The vectors, $\Psi_i$, in equation (2) above, correspond to the i-th basis function. A linear combination of all these basis functions clearly represents the complete TRC as shown below.

$$C_i = \sum_{j=1}^{n} \alpha_{ji}\Psi_j + \overline{C} \qquad (3)$$

For the three dimensional example shown in FIG. 4, the numerical values of the singular values are given by $$\Pi_1=4.9917,\ \Pi_2=0.9972,\ \Pi_3=0.6044.$$

The dimensions of the cloud diagram are measurable using the ratio of the singular values:

$$\frac{X_1}{Y} = \frac{\Pi_1}{\Pi_2} \qquad (4)$$

where $x_1$ and Y are the first minor and major axes of the ellipsoid.

If there are only three dominant eigenvalues, then only three basis functions would be needed to approximate the complete TRC. The basis functions have orthoganality property, just as sine and cosine functions in a Fourier decomposition of the composite function. They are nothing but the dominant eigen functions of the system with preferably some physical meaning to them as dictated by the physical process. An approximated TRC is now given by:

$$C_i \approx \hat{C}_i = \alpha_{1i}\Psi_1 + \alpha_{2i}\Psi_2 + \alpha_{3i}\Psi_3 + \overline{C} \qquad (5)$$

The coefficients α's are obtained by various forms. One straight forward way is by computing the following dot product.

$$\alpha_{ji} = (C_i - \overline{C})^T \Psi_j \qquad (6)$$

where i =1,2, . . . , N , j=1,2, . . .,n. Clearly, the ratio between the major and minor axes of the ellipsoid is given by the ratio of the first and the second eigenvalues. The size of the cloud is visible from the eigenvalues. Hence, by using this approach it is easy to learn something about the dominant modes affecting the TRC.

Figure 5A:
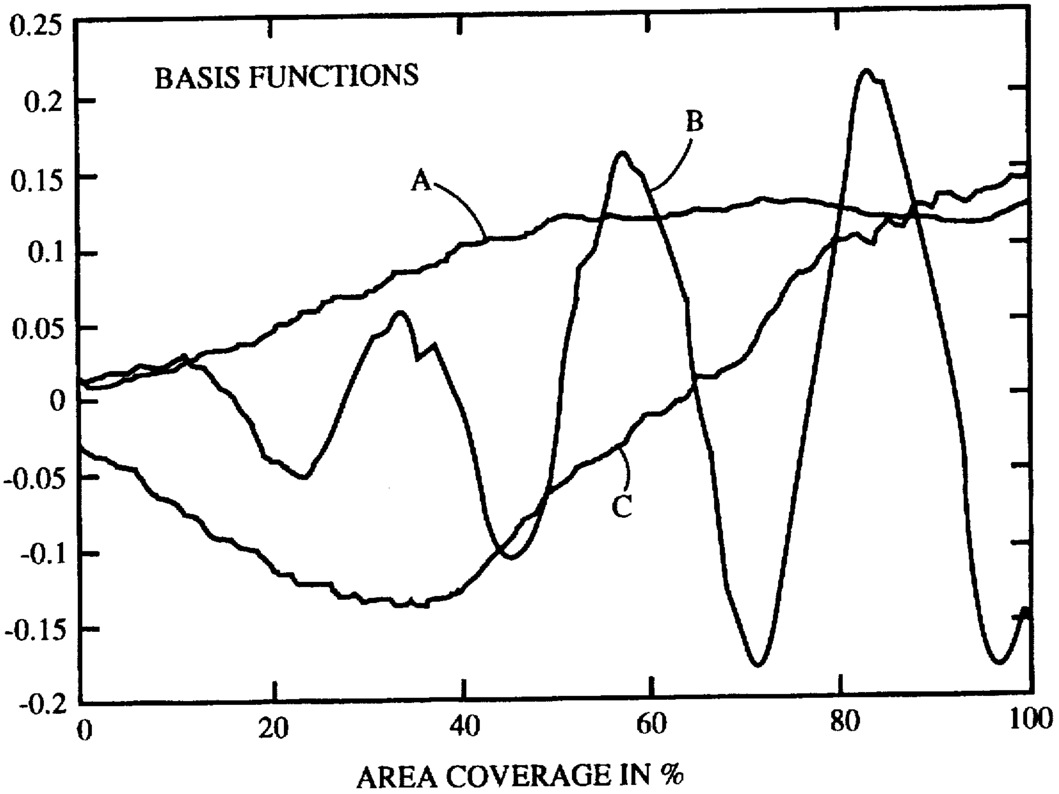
FIG. 5A is a plot of three basis functions with respect to area coverage and FIG. 5B is a plot of a sample TRC accordance with the present invention.
Figure 5B:
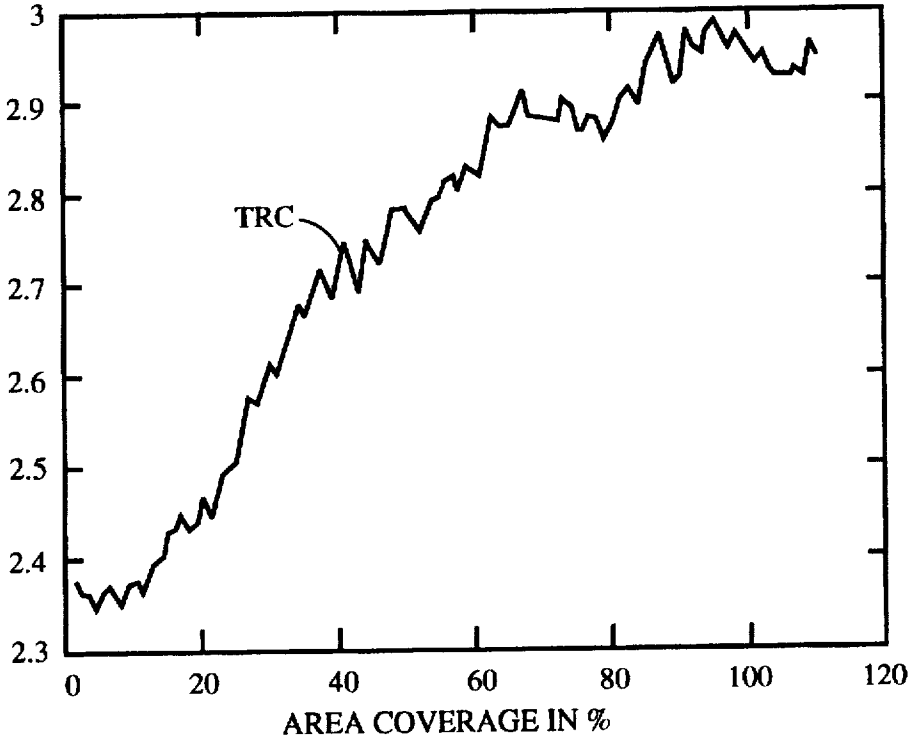

In FIG. 5A, there are shown three basis functions with respect to the input area coverages, and FIG. 5B shows a sample TRC. Clearly, basis function A in FIG. 5A duplicates the monotonicity of the TRC in FIG. 5B.

One possible use of the basis function approach is for TRC reconstruction. Generally three to five patches are created and then the reconstruction of the TRC is done by using a blind spline fit interpolation routine. An improved reconstruction technique has been shown in pending application D/96502 U.S. Ser. No. 754,561 filed Nov. 21, 1996. Also, the basis function approach can solve the same problem when the coefficients, α's, in equation 5 are known in terms of the actuators.

Figure 6:
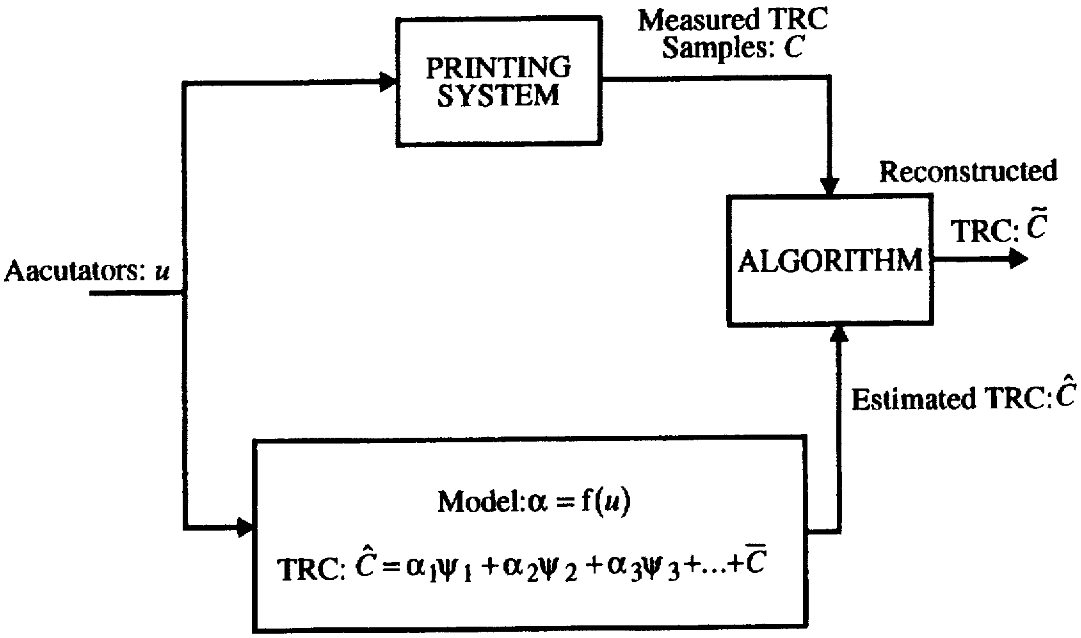
FIG. 6 is a schematic diagram of a reconstruction technique in accordance with the present invention.

The coefficients, α's , can be modeled with respect to actuators by performing parametrization on the input -output experimental data by spanning the entire operable TRC space of with a given machine. For example, if such a model exists (it is shown below how to obtain four different types of examples) then, the question is how to reconstruct the TRC from a minimal number of measurements. A block diagram, as illustrated in FIG. 6 demonstrates a solution. The model predicts the entire TRC (called $\hat{C}$) for a given set of actuator conditions.

For example, if, C represents three measured TRC samples, then the vector C contains zeros at all locations other than at locations where the measurements were done. Then, it is possible to merge C with $\hat{C}$ by replacing zeros in C with corresponding predicted values from $\hat{C}$ to get an updated TRC, $\tilde{C}$. A simple, but crude way of fusing or melding C with $\hat{C}$ is done inside the block represented by "Fusing Algorithm" by replacing zeros in C with corresponding predicted values from $\hat{C}$ to get an updated TRC, $\tilde{C}$.

$$\alpha_{ji}=(\tilde{C}_i-\bar{C})^T\Psi_j \tag{7}$$

where subscript j corresponds to the basis function number.

A parameterized linear model of α's is obtained from the experimental data as shown below. Assume that a three dimensional TRC approximation is acceptable (i.e., using only three basis functions in the reconstruction process). Five different models were generated, and the mean square errors resulting from the fit were compared. The best model for the experimental data can then be selected from the results. To make this document complete, the construction procedures used for all five models are:

Model #1: Linear:

When using three dimensional approximations, TRC can be reconstructed with three α's. Since these α's are known from equation 6 above, it is possible to construct the linear relationship between α's and the actuators as follows.

$$[u_g u_l u_b]_i \begin{bmatrix} m_{11} \\ m_{12} \\ m_{13} \end{bmatrix} = \alpha_{1i};\ [u_g u_l u_b]_i \begin{bmatrix} m_{21} \\ m_{22} \\ m_{23} \end{bmatrix} = \alpha_{2i};\ [u_g u_l u_b]_i \begin{bmatrix} m_{31} \\ m_{32} \\ m_{33} \end{bmatrix} = \alpha_{3i}. \tag{8}$$

In equation 8, 'i' is used to designate the experimental set.

By conducting only three experiments, three parameters, $m_{11}$, $m_{12}$, $m_{13}$, . . . , can be calculated. However, it would be useful to calculate α's with the least squares approximation with all N sets of input-output experiments. At first how to construct $m_{11}$, $m_{12}$, $m_{13}$ is shown. The other parameters can be determined by repeating this technique.

Consider for simplicity $M_1=[m_{11}\ m_{12}\ m_{13}]^T$, $M_2=[m_{21}\ m_{22}\ m_{23}]^T$, $M_3=[m_{31}\ m_{32}\ m_{33}]^T$ and $u_i^T=[u_g\ u_l\ u_b]_i$. Then, equation 8 for $\alpha_{1i}$ can be written in matrix form as, $$u_i^T M_1=\alpha_{1i} \tag{9}$$

Let us construct a performance index as follows.

$$J=\sum_{i=1}^{N}[\alpha_{1i}-u_i^T M_1][\alpha_{1i}-u_i^T M_1]^T \tag{10}$$

i.e., $$J=\sum_{i=1}^{N}[\alpha_{1i}-u_i^T M_1]^2$$

Differentiating equation 10 with respect to $M_1$ and equating the resulting equation to 0 we get, $$M_1=\left[\sum_{i=1}^{N}u_i u_i^T\right]^{-1}\sum_{i=1}^{N}\alpha_{1i}u_i \tag{11}$$

In a similar way, parameter sets, $M_2$ and $M_3$ can be obtained. Thus three α's are modeled with nine parameters.

Model #2: Linear & Affine:

To obtain this model we replace u vector and the parameter vectors, $M_1$, $M_2$ and $M_3$ in equation 8 by new parameters shown below.

$$u_i=\begin{bmatrix} 1 \\ u_g \\ u_l \\ u_b \end{bmatrix}_i;\ M_1=\begin{bmatrix} m_{10} \\ m_{11} \\ m_{12} \\ m_{13} \end{bmatrix};\ M_2=\begin{bmatrix} m_{20} \\ m_{21} \\ m_{22} \\ m_{23} \end{bmatrix};\ m_3=\begin{bmatrix} m_{30} \\ m_{31} \\ m_{32} \\ m_{33} \end{bmatrix}. \tag{12}$$

Using equation 12 and then solving equation 11, the new parameters can be obtained. Note that in this model there are 12 parameters as compared to 9 in model #1.

Model #3: Pure quadratic:

To obtain this model, replace u vector and the parameter vectors, $M_1$, $M_2$ and $M_3$ in equation 8 by the following parameters:

$$u_i=\begin{bmatrix} u_g^2 \\ u_l^2 \\ u_b^2 \\ u_g u_l \\ u_l u_b \\ u_b u_g \end{bmatrix}_i;\ M_1=\begin{bmatrix} m_{11} \\ . \\ . \\ . \\ m_{16} \end{bmatrix};\ M_1=\begin{bmatrix} m_{21} \\ . \\ . \\ . \\ m_{26} \end{bmatrix};\ M_3=\begin{bmatrix} m_{31} \\ . \\ . \\ . \\ m_{36} \end{bmatrix} \tag{13}$$

Using equations 13 and then solving equation 11 new parameters can be obtained. Note that in this model we have 18 parameters.

Model #4: Affine, linear, quadratic:

In this model, the u vector contains the following elements.

$$u_i=[1 u_g\ u_g^2\ u_l\ u_l^2\ u_g u_l\ u_l u_b\ u_b u_b u_g]_i^T \tag{14}$$

Vectors., $M_1$, $M_2$ and $M_3$ contain 10 elements each. Number of parameters in this model are 30. In a similar way, an affine, linear, quadratic and cubic equation was modeled. Model #4 - affine, linear and quadratic fit, turned out to be the best parameterized model for the input-output data.

Figure 7:
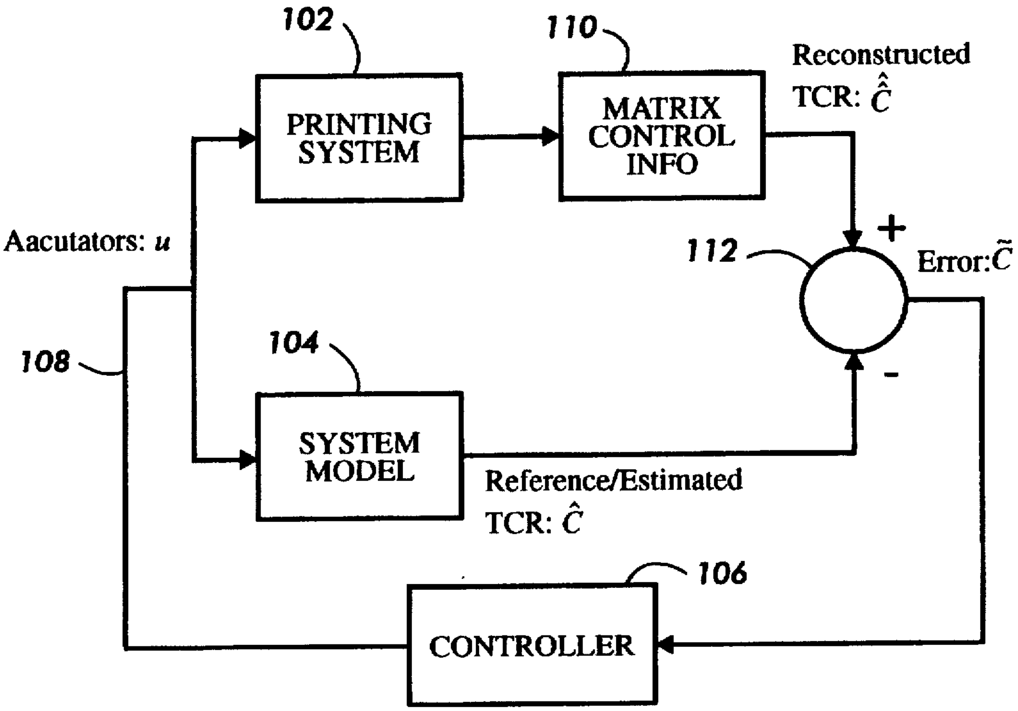
FIG. 7 is a schematic diagram of a process control loop in accordance with the present invention.

Not only can basis functions be used for TRC reconstruction, but also the basis function approach can be used for process controls as illustrated in FIG. 7. An error signal is generated by subtracting the reconstructed TRC with the model output. It is then processed inside a controller that will be designed by using the basis functions to close the feedback loop. In particular, an imaging system such as printing system 102 and system model shown at 104 are responsive to actuators illustrated at 108. The actuators 108 are controlled elements such as imaging surface voltage, developer bias voltage, and projecting system power. Suitable sensors provide indications of the state or level the actuators to controller 106 which in turn provides the necessary change or adjustment to the printing operation.

System model 104 represents an experimental fundamental functional relationship such as the TRC relationship of the printing system 102 in suitable memory apart from the system 102 or controller 106 or incorporated therein. In one embodiment, system 104 represents an estimated or predicted TRC defined by orthogonal basis functions such as defined by the alpha coefficients in the expression $$C_i = \hat{C}i = \alpha_{1i}\Psi_1 + \alpha_{2i}\Psi_2 + \alpha_{3i}\Psi_3 + \bar{C}$$

wherein the a coefficients are known in terms of the actuators.

The system model 104 responds to the actuator sensed values to provide a reference or predicted TRC. Also included as part of the printing system 102 and controller 106, illustrated at 110, is a suitable look up table responding to discrete tone reproduction samples or sensed test patches to reconstruct a complete tone reproduction curve from minimal samples. The look up table is any suitable technique for reconstruction of an entire tone reproduction curve from minimal discrete samples such as a table incorporating a covariance matrix of elements containing tone reproduction samples and least squares optimal reconstruction. Comparator 112 compares or melds the reconstructed TRC and the reference TRC to provide error signals to controller 106 for appropriate adjustments to the printing system actuators.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an imaging system having a control including a set of actuators for projecting an image onto an imaging surface, a method of machine control comprising the steps of;

modeling the imaging system with respect to the actuators for producing a predicted tone reproduction curve, the predicted tone reproduction curve being defined by the expression $$C_i = \hat{C}i = \alpha_{1i}\Psi_1 + \alpha_{2i}\Psi_2 + \alpha_{3i}\Psi_3 + \bar{C},$$

where α's are coefficients, ψ's are basis functions, and C represents a toner reproduction curve, obtaining a discrete number of tone reproduction samples, melding the predicted tone reproduction curve and the discrete number of tone reproduction samples to provide a reconstructed tone reproduction curve, and responding to the reconstructed tone reproduction curve to control machine operation.

2. The method of claim 1 wherein in the expression, $$C_i = \hat{C}i = \alpha_{1i}\Psi_1 + \alpha_{2i}\Psi_2 + \alpha_{3i}\Psi_3 + \bar{C},$$

the alpha coefficients are known in terms of said actuators.

3. The method of claim 1 wherein the actuators include at least one of imaging surface voltage, developer bias voltage, and projecting system power.

4. In an imaging system having tone reproduction curves for a set of actuators for projecting an image onto an imaging surface, a method of decomposing the tone reproduction curves into basis functions comprising the steps of:

defining the complete space of tone reproduction curve variance upon actuator change, approximating to a suitable geometric shape said complete space defined by a covariance matrix of size n×n, defined by $$\Sigma = \frac{1}{N}\sum_{i=1}^{N}[C_i - \bar{C}][C_i - \bar{C}]^T,$$

where $[\Sigma \in \mathfrak{R}^{n \times n}$ and$]$n equals the total number of samples per tone reproduction curve, $C_j$ equals ith TRC, $\hat{C}$ equals average of N number of TRC's, T represents the matrix transpose, and N equals a set of tone reproduction curves, forming singular value decomposition on the covariance matrix to provide $$\Sigma = \sum_{i=1}^{n} \Pi_i^2 \Psi_i \Psi_i^T$$

wherein the vectors, $\Psi_i$, in the equation correspond to an i-th basis function, and π corresponds to the matrix containing eigenvalues, and providing a linear combination of the basis functions representing a complete tone reproduction curve defined by $$C_i = \sum_{j=1}^{n} \alpha_{ji}\Psi_j + \bar{C},$$

with α's representing coefficients.

5. In an imaging system having tone reproduction curves for a set of actuators for projecting an image onto an imaging surface, a method of decomposing the tone reproduction curves into basis functions comprising the steps of:

defining a complete space of tone reproduction curve variance upon actuator change, approximating to a suitable geometric shape said complete space defined by a covariance matrix and a given number of samples per tone reproduction curve and a given subset of tone reproduction curve samples, forming singular value decomposition on the covariance matrix to provide vectors corresponding to an i-th basis function, and providing a linear combination of the basis functions representing a complete tone reproduction curve.

6. The method of claim 5 wherein the tone reproduction curve represented by a linear combination of basis functions is defined by $$C_i = \sum_{j=1}^{n} \alpha_{ji}\Psi_j + \bar{C}$$

where α's are coefficients, ψ's are basis functions, and C represents a toner reproduction curve.

7. The method of claim 5 wherein the tone reproduction curve represented by a linear combination of basis functions is defined by $$C_i = \hat{C}i = \alpha_{1i}\Psi_1 + \alpha_{2i}\Psi_2 + \alpha_{3i}\Psi_3 + \bar{C},$$

the α coefficients being in terms of said actuators.

8. The method of claim 5 wherein the covariance matrix defined by $$\Sigma = \frac{1}{N}\sum_{i=1}^{N}[C_i - \bar{C}][C_i - \bar{C}]^T,$$

where $[\Sigma \mathfrak{R}^{n \times n}$ and$]$ n equals the total number of samples per tone reproduction curve, $C_j$ equals the ith TRC, $\bar{C}$equals average of N number of TRC's, T represents the matrix transpose, and N equals a set of tone reproduction curves.

9. The method of claim 5 wherein the step of forming singular value decomposition on the covariance matrix includes the step of providing $$\Sigma = \sum_{i=1}^{n} \Pi_i^2 \Psi_i \Psi_i^T$$

wherein the vectors, $\Psi_i$, correspond to an i-th basis function and $\pi$ corresponds to the matrix containing eigenvalues.

10. In an imaging system for projecting an image onto an imaging surface, the imaging system having a control including actuators and a model of tone reproduction curve response, a method of reconstructing a tone reproduction curve for use in controlling the imaging system operation comprising the steps of:

predicting a tone reproduction curve for a given set of actuator conditions, sensing a discrete number of tone reproduction samples, and merging the discrete number of tone reproduction samples with the tone reproduction curve to provide a reconstructed tone reproduction curve.

11. The method of claim 10 wherein the model of tone reproduction curve response is defined by the expression $$C_i \approx \hat{C}i = \alpha_{1i}\Psi_1 + \alpha_{2i}\Psi_2 + \alpha_{3i}\Psi_3 + \bar{C}$$

where $\alpha$'s are coefficients, $\psi$'s are basis functions, and C represents a toner reproduction curve.

12. The method of claim 10 wherein the reconstructed tone reproduction curve is defined by $$\alpha_i = (\bar{C} - \bar{C})^T \Psi_j$$

where the subscript j corresponds to a basis function number.

13. In an imaging system for projecting an image onto an imaging surface, the imaging system having a control including actuators and a model of tone reproduction curve response, the model of tone reproduction curve response being defined by $$C_i \approx \hat{C}i = \alpha_{1i}\Psi_1 + \alpha_{2i}\Psi_2 + \alpha_{3i}\Psi_3 + \bar{C}$$

where $\alpha$'s are coefficients, $\psi$'s are basis functions, and C represents a toner reproduction curve, a method of reconstructing a tone reproduction curve for use in controlling the imaging system operation comprising the steps of:

predicting a tone reproduction curve for a given set of actuator conditions, sensing a discrete number of tone reproduction samples, and merging the discrete number of tone reproduction samples with the tone reproduction curve to provide a reconstructed tone reproduction curve.

14. In an imaging system having a control including a set of actuators for projecting an image onto an imaging surface, a method of reconstructing a tone reproduction curve for use in controlling the imaging system operation comprising the steps of providing a model of the imaging system with respect to the actuators for producing a predicted tone reproduction curve, obtaining a discrete number of tone reproduction samples, melding the predicted tone reproduction curve and the discrete number of tone reproduction samples to provide a reconstructed tone reproduction curve, and responding to the reconstructed tone reproduction curve to control machine operation.

15. The method of claim 14 wherein the predicted tone reproduction curve is defined by $$C_i \approx \hat{C}i = \alpha_{1i}\Psi_1 + \alpha_{2i}\Psi_2 + \alpha_{3i}\Psi_3 + \bar{C}$$

where $\alpha$'s are coefficients, $\psi$'s are basis functions, and C represents a toner reproduction curve.

16. In an imaging system having a control including a set of actuators for projecting an image onto an imaging surface, a method of machine control comprising the steps of;

modeling the imaging system with respect to the actuators for producing a predicted tone reproduction curve, obtaining a discrete number of tone reproduction samples, providing a look up table responding to the tone reproduction samples to produce a reconstructed tone reproduction curve, and comparing the predicted tone reproduction curve and the reconstructed tone reproduction curve to adjust machine operation.

17. The method of claim 16 wherein the predicted tone reproduction curve is defined by the expression $$C_i \approx \hat{C}i = \alpha_{1i}\Psi_1 + \alpha_{2i}\Psi_2 + \alpha_{3i}\Psi_3 + \bar{C}$$

where $\alpha$'s are coefficients, $\psi$'s are basis functions, and C represents a toner reproduction curve, wherein the $\alpha$ coefficients are known in terms of said actuators.

18. The method of claim 16 wherein the look up table is defined by the matrix $$\Pi^{+} = \Sigma\Pi(\Pi^T\Sigma\Pi)^{-1},$$

wherein $\pi$ corresponds to the matrix containing eigenvalues, and incorporates an estimated linear reconstruction defined by $$\hat{a} = \Pi^{+}c$$

where $\Pi^{+}$ represents a least squares optimal reconstruction.

19. The method of claim 16 wherein the actuators are imaging surface voltage, developer bias voltage, and projecting system power.

20. The method of claim 16 wherein the look up table incorporates a covariance matrix of elements containing tone reproduction samples.

21. The method of claim 20 including a matrix multiplier responding to sensed samples and to the look up table to reproduce a complete tone reproduction curve.

22. In an imaging system having a control including a set of actuators for projecting an image onto an imaging surface, a method of machine control comprising the steps of:

providing a model of the imaging system with respect to actuators for producing a predicted tone reproduction curve, the model including a linear combination of basis functions derived by decomposing sample tone reproduction curves, producing a discrete number of tone reproduction samples, and melding the predicted tone reproduction curve and the tone reproduction samples to provide a reconstructed tone reproduction curve for machine control.

23. In an imaging system having a control including a set of actuators for projecting an image onto an imaging surface, a method of machine control comprising the steps of:

providing a linear combination of basis functions, producing a discrete number of tone reproduction samples, and melding the linear combination of basis functions and the tone reproduction samples to provide a reconstructed tone reproduction curve for machine control.

24. The method of claim 23 wherein the linear combination of basis functions is derived by decomposing sample tone reproduction curves.

* * * * *